(12) United States Patent
Sato (10) Patent No.: US 9,665,315 B2
(45) Date of Patent: May 30, 2017

(54) IMAGE FORMING APPARATUS AND IMAGE FORMING METHOD

(71) Applicant: Oki Data Corporation, Tokyo (JP)

(72) Inventor: Hideki Sato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/867,637

(22) Filed: Sep. 28, 2015

(65) Prior Publication Data

US 2016/0092144 A1 Mar. 31, 2016

(30) Foreign Application Priority Data

Sep. 29, 2014 (JP) .................................. 2014-198203

(51) Int. Cl.
*G06F 3/12* (2006.01)

(52) U.S. Cl.
CPC .......... *G06F 3/1205* (2013.01); *G06F 3/1228* (2013.01); *G06F 3/1257* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2007/0002349 A1* | 1/2007 | Hwang | G06F 3/1204 358/1.13 |
| 2007/0003306 A1* | 1/2007 | Jacobsen | G03G 15/556 399/79 |
| 2008/0074694 A1* | 3/2008 | Saida | G06K 15/00 358/1.15 |
| 2009/0219576 A1* | 9/2009 | Akiyama | G06K 15/02 358/1.16 |
| 2010/0054764 A1* | 3/2010 | Nishikawa | G03G 15/553 399/27 |
| 2012/0320410 A1* | 12/2012 | Kakegawa | G06F 3/1219 358/1.15 |
| 2013/0235392 A1* | 9/2013 | Iinuma | G06K 15/005 358/1.2 |
| 2015/0055159 A1* | 2/2015 | Kazama | H04N 1/33369 358/1.13 |

FOREIGN PATENT DOCUMENTS

JP 2006-240029 A 9/2006

* cited by examiner

*Primary Examiner* — Dung Tran
(74) *Attorney, Agent, or Firm* — Rabin & Berdo, P.C.

(57) ABSTRACT

An image forming apparatus includes a receiving unit, a control unit and an image forming unit. The receiving unit receives first data indicating first print setting information, second data indicating second print setting information and image data. The control unit designates third print setting information based on the first print setting information and the second print setting information. The image forming unit forms an image on a sheet based on the image data by using the third print setting information.

15 Claims, 6 Drawing Sheets

| SETTING ID | AUGMENTED SETTING ITEM |
|---|---|
| ID1 | TONER SAVING = ON<br>TONER SAVING FOR 100% BLACK = ON |
| ID2 | TONER SAVING = ON<br>TONER SAVING FOR 100% BLACK = OFF |

FIG. 8

| USER ID | PRINTING DESIGNATION | SETTING ID |
|---|---|---|
| USER A | COLOR MODE = COLOR RESOLUTION = 600dpi | ID1 |
| USER A | COLOR MODE = COLOR RESOLUTION = 1200dpi | ID2 |
| USER B | COLOR MODE = COLOR RESOLUTION = 1200dpi | ID2 |
| USER C | COLOR MODE = COLOR RESOLUTION = 600dpi | ID1 |
| ⋮ | ⋮ | ⋮ |

IMAGE FORMING APPARATUS AND IMAGE FORMING METHOD

CROSS REFERENCE TO RELATED APPLICATIONS

This application claims priority based on 35 USC 119 from prior Japanese Patent Application No. 2014-198203 filed on Sep. 29, 2014, the entire contents which are incorporated herein by reference.

BACKGROUND OF THE INVENTION

1. Field of the Invention

This application relates to an image forming apparatus and an image forming method.

2. Description of Related Art

In a conventional printing system, a printer stores print setting information corresponding to each user. The printer searches the print setting information. The printer applies the searched print setting information (see, for example, Japanese Laid-open Patent Publication No. 2006-240029).

Usually, when the user uses a printer driver, the user can designate print setting information tailored to the particular model of the printer, which includes common or generic (general) print setting information shared by many models of printers and augmented print setting information for the particular features of that model of the printer. However, when the user uses a universal printer driver or when print processing is executed without using a printer driver, namely by a direct printing method, the user cannot designate the augmented print setting information.

SUMMARY OF THE INVENTION

According to an aspect of the disclosed invention, an image forming apparatus includes a receiving unit, a control unit and an image forming unit. The receiving unit receives first data indicating first print setting information, second data indicating second print setting information and image data. The control unit designates third print setting information based on the first print setting information and the second print setting information. The image forming unit forms an image on a sheet based on the image data by using the third print setting information.

According to another aspect of the disclosed invention, an image forming apparatus includes a receiving unit, a control unit and an image forming unit. The receiving unit receives an image forming job that includes data indicating print setting information about a first function for forming an image and image data indicating the image. The control unit designates print setting information about a second function for forming the image based on the print setting information about the first function. The image forming unit forms the image on a sheet based on the image data by using the print setting information about the first function and the print setting information about the second function.

According to another aspect of the disclosed invention, an image forming method includes receiving first data indicating first print setting information, second data indicating second print setting information and image data, designating third print setting information based on the first print setting information and the second print setting information, forming an image on a sheet based on the image data by using the third print setting information.

According to this invention, even if a user cannot designate augmented print setting information for the particular model of printer, the image forming apparatus can form an image on a sheet based on the augmented print setting information for the printer.

DETAILED DESCRIPTION OF EMBODIMENTS

Hereinafter, preferred embodiments of the invention will be described with reference to the attached drawings.

1. Structure

Figure 1:
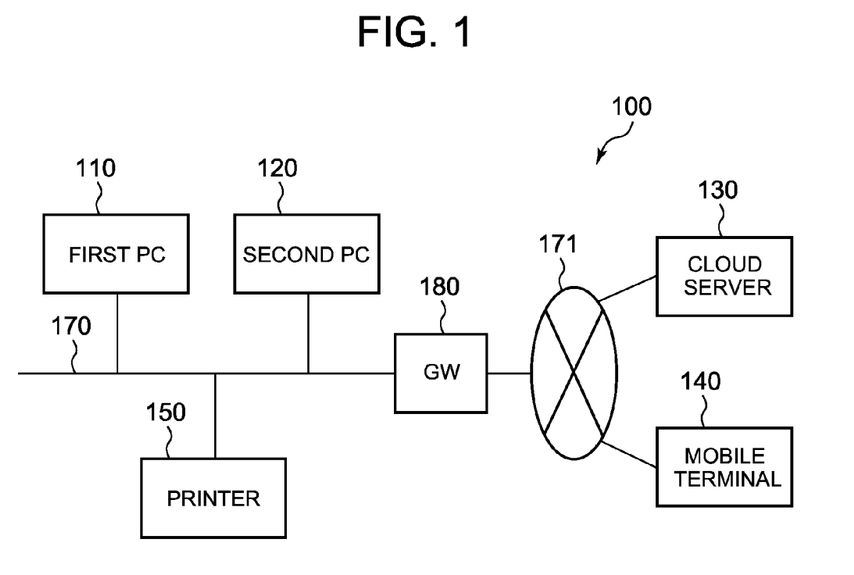
FIG. 1 is a block diagram showing an image forming system.

As shown in FIG. 1, an image forming system 100 may include a first PC (Personal Computer) 110, a second PC 120, a cloud server 130, a mobile terminal 140 and a printer 150 as an image forming apparatus.

The first PC 110, the second PC 120 and the printer 150 are connected to a LAN (Local Area Network) 170. The printer 150 receives a printing job (an image forming job) from the first PC 110 or the second PC 120. The printer 150 executes print processing (processing for image formation) based on the received printing job.

A GW (Gateway) 180 is connected to the LAN 170. The first PC 110, the second PC 120 and the printer 150 are connected to the Internet 171 through the GW 180. The cloud server 130 and the mobile terminal 140 are connected to the Internet 171. The printer 150 receives the printing job from the cloud server 130 or the mobile terminal 140. The printer 150 executes the print processing based on the received printing job.

The form of connection of these apparatuses is not limited to the example shown in FIG. 1.

Figure 2:
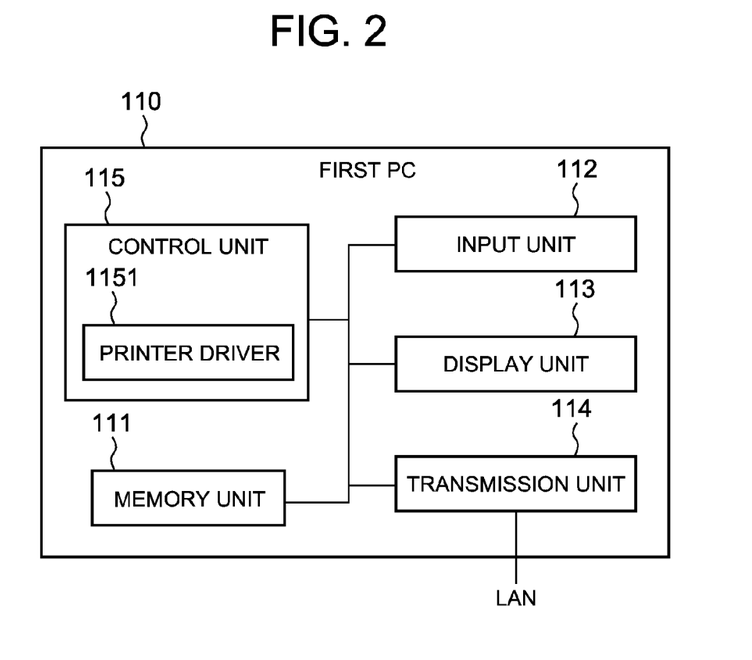
FIG. 2 is a block diagram showing a configuration of a first PC.

As shown in FIG. 2, the first PC 110 may include a memory unit 111, an input unit 112, a display unit 113, a transmission unit 114 and a control unit 115.

The memory unit 111 stores data used for processing in the first PC 110. The memory unit 111 stores a user ID that indicates user identification information for identifying a user who uses the first PC 110. The user ID is input by the user in advance, through a user information input screen displayed on the display unit 113 and the input unit 112. The user ID is used as source identification information that identifies the source of the printing job.

The input unit 112 accepts an input. The display unit 113 displays a screen. The transmission unit 114 functions as a sending unit and a receiving unit. The sending unit transmits data to LAN 170. The receiving unit receives data from LAN 170.

The control unit 115 controls processing in the first PC 110.

For example, the control unit 115 accepts a designation of print setting information for executing the printing processing by using a printer driver 1151 through the display unit 113 and the input unit 112. The control unit 115 generates the printing job based on the designated print setting information. The printer driver 1151 is a printer driver that is specifically designed for use with the printer 150 (the particular model of the printer 150). The printer driver 1151 is able to designate augmented print setting information as well as general print setting information. The augmented print setting information is information about one or more augmented printing functions (image forming functions) of the printer 150 that has common or generic (general) printing functions that are generally shared by different printer models and augmented printing functions that are particular features of the model of the printer 150.

Figure 3:
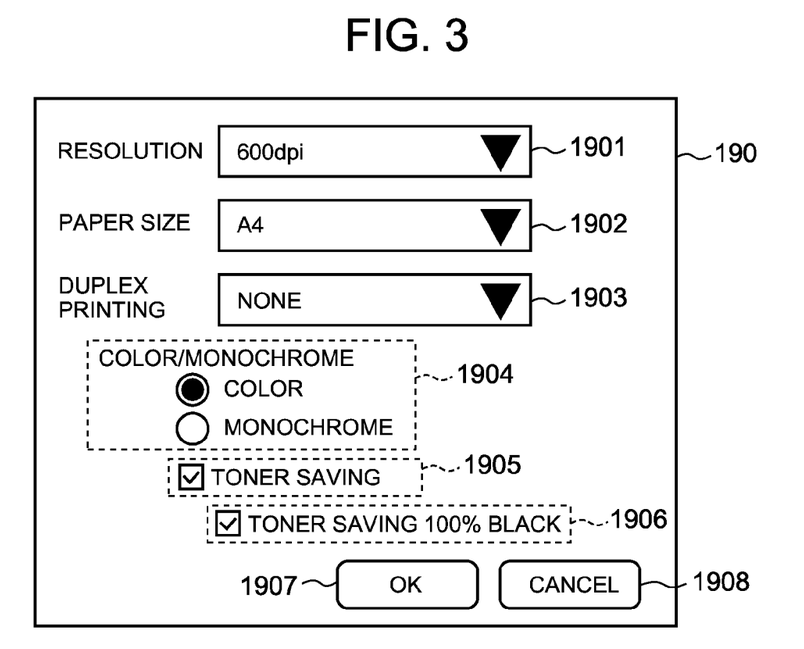
FIG. 3 is a schematic view showing a screen of printer driver.

Particularly, the control 115 controls the display unit 113 to display a first setting screen 190 when the image for printing is designated through the input unit 112. The control unit 115 accepts the designation of the print setting information based on a user operation through the first setting screen 190. Namely, the first setting screen 190 is a screen of the printer driver 1151.

As shown in FIG. 3, the first setting screen 190 includes a resolution designation column 1901, a paper size designation column 1902, a duplex printing designation column (a duplex image forming designation column) 1903, a color/monochrome designation column 1904, a toner saving designation column 1905, a toner saving for 100% black designation column 1906, an OK input column 1907 and a cancel input column 1908.

The resolution designation column 1901 accepts a designation for resolution. The paper size designation column 1902 accepts a designation for paper size. The duplex printing column 1903 accepts a designation as to whether or not the duplex printing is executed. The color/monochrome designation column 1904 accepts a designation for a printing color (an image forming color). The toner saving designation column 1905 accepts a designation as to whether or not the printing is executed while saving a toner that is a developer. The toner saving for 100% black designation column 1906 accepts a designation as to whether or not even a 100% black toner used for a character is saved.

The OK input column 1907 accepts a designation for executing print processing by the print setting information designated in the column 1901-1906. The cancel input column 1908 accepts a designation for cancelling the print setting information designated in the column 1901-1906.

The resolution, the paper size, the duplex printing and the printing color are the general print setting information. The toner saving and the toner saving for 100% black are the augmented print setting information. Namely, the resolution designation column 1901, the paper size designation column 1902, the duplex printing column 1903 and the color/monochrome designation column 1904 are columns for designating the general print setting information. The toner saving designation column 1905 and the toner saving for 100% black designation column 1906 are columns for designating the augmented print setting information.

When the OK input column 1907 accepts the designation, the control unit 115 generates a first printing job. The first printing job includes the user ID stored in the memory unit 111, setting data indicating the print setting information designated through the first setting screen 190 and image data indicating the image for printing. The image data may be described in PDL (page description language). The print setting information designated through the first setting screen 190 is information about a function for the print processing (the processing for forming an image). The control unit 115 outputs the first printing job to the transmission unit 114. The control unit 115 controls the transmission unit 114 to transmit the first printing job to the printer 150. The first printing job includes the setting data indicating the general print setting information and the augmented print setting information.

Figure 4:
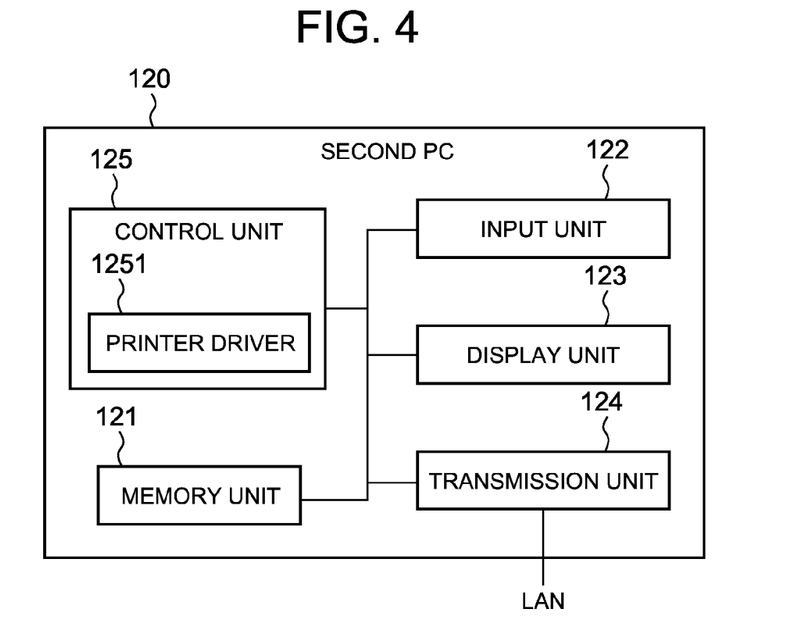
FIG. 4 is a block diagram showing a configuration of a second PC.

As shown in FIG. 4, the second PC 120 may include a memory unit 121, an input unit 122, a display unit 123, a transmission unit 124 and a control unit 125. The structure of the memory unit 121, the input unit 122, the display unit 123 and transmission unit 124 are the same as that of the previously described memory unit 111, input unit 112, display unit 113 and transmission unit 114 of the first PC 110.

The control unit 125 controls a processing in the second PC 120.

For example, the control unit 125 accepts designation of print setting information for executing the print processing by using a printer driver 1251 through the display unit 123 and the input unit 122. The control unit 125 generates the printing job based on the designated print setting information. The printer driver 1251 can designate only the general print setting information. The printer driver 1251 may be usable on any printer model, or at least on a large number of printer models. The printer driver 1251 may be provided by a printer server. The printer driver 1251 can designate the general print setting information such as the paper size. On the other hand, the printer driver 1251 cannot designate the augmented print setting information such as the toner saving that is an augmented function of the printer 150.

Figure 5:
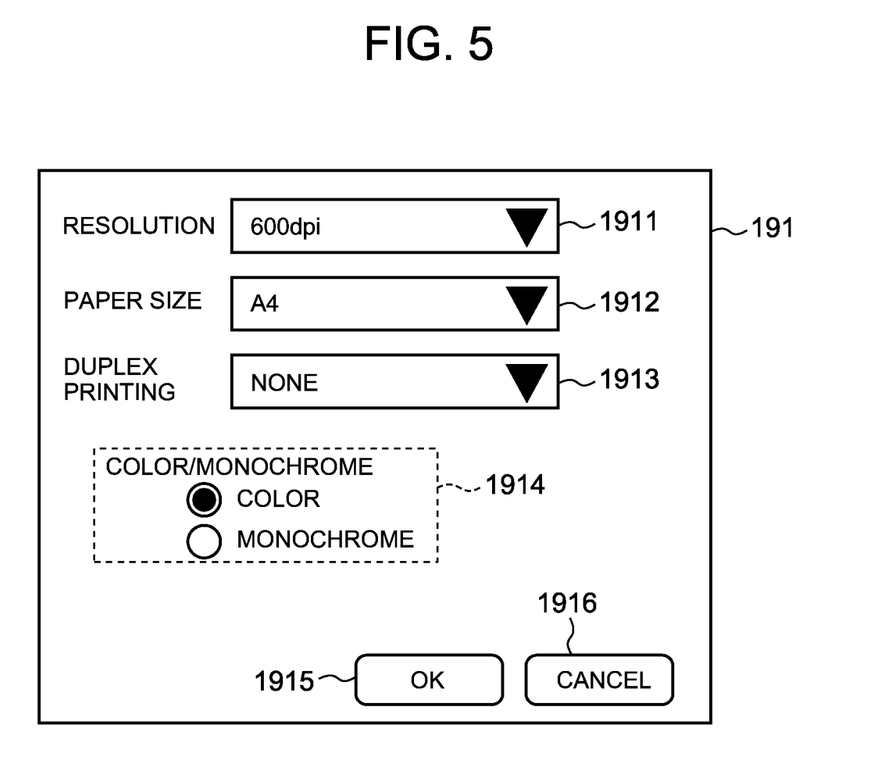
FIG. 5 is a schematic view showing a screen of printer driver.

Particularly, the control unit 125 controls the display unit 123 to display a second setting screen 191 when the image for printing is designated through the input unit 122. The control unit 125 accepts the designation of the print setting information based on a user operation through the second setting screen 191. Namely, the second setting screen 191 is a screen of the printer driver 1251.

As shown in FIG. 5, the second setting screen 191 includes a resolution designation column 1911, a paper size designation column 1912, a duplex printing designation column 1913, a color/monochrome designation column 1914, an OK input column 1915 and a cancel input column 1916. The structure of these are same as that of the previously described resolution designation column 1901, paper size designation column 1902, duplex printing designation column 1903, color/monochrome designation column 1904, OK input column 1907 and cancel input column 1908 of the first setting screen 190.

The second setting screen 191 does not include the designation columns corresponding to the toner saving designation column 1905 and the toner saving for 100% black designation column 1906 of the first setting screen 190. Therefore, the second setting screen 191 cannot designate the toner saving and the toner saving for 100% black that are augmented functions of the printer 150.

When the OK input column 1915 accepts the designation, the control unit 125 generates a second printing job. The second printing job includes the user ID stored in the memory unit 121, setting data indicating the print setting information designated through the second setting screen 191 and image data indicating the image for printing. The control unit 125 controls the transmission unit 124 to transmit the second printing job to the printer 150.

The second printing job includes setting data indicating general print setting information. The second printing job does not include setting data indicating the augmented print setting information.

The cloud server 130 and the mobile terminal 140 can also generate the second printing job. The cloud server 130 and the mobile terminal 140 cause the printer 150 to execute the print processing by transmitting the second printing job to the printer 150.

Figure 6:
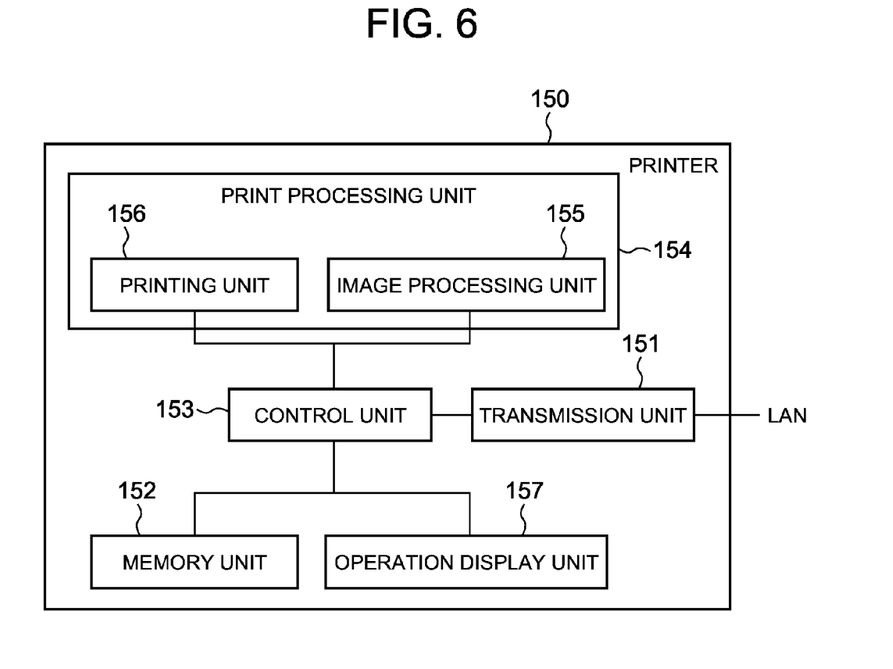
FIG. 6 is a block diagram showing a configuration of a printer.

As shown in FIG. 6, the printer 150 may include a transmission unit 151, a memory unit 152, a control unit 153, a print processing unit 154 as an image forming unit and an operation display unit 157.

The transmission unit 151 functions as a sending unit and a receiving unit. The sending unit transmits data to LAN 170. The receiving unit receives data from LAN 170. The transmission unit 151 receives the printing job. The transmission unit 151 outputs the printing job to the control unit 153.

The memory unit 152 stores data used for processing in the printer 150. The memory unit 152 stores augmented setting data 192 and designation data 193. The augmented setting data 192 and the designation data 193 are data for designating new (added) print setting information based on print setting information indicated by data received by the transmission unit 151.

Figure 7:
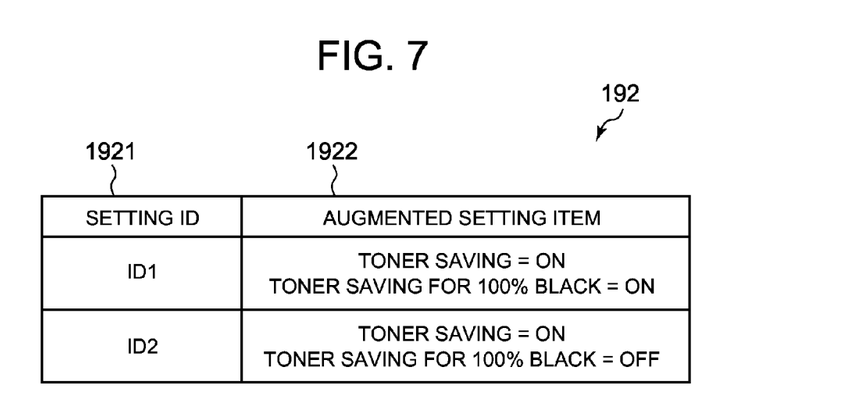
FIG. 7 is a schematic view showing augmented print setting data for a particular printer model.

As shown in FIG. 7, the augmented setting data 192 includes setting ID column 1921 and augmented setting item column 1922.

The setting ID column 1921 stores a setting ID as setting identification information for identifying setting information stored in the augmented setting item column 1922.

The augmented setting item column 1922 stores the augmented print setting information (third setting information) identified by the detail setting ID. For example, if the setting ID is "1", the toner saving and the toner saving for 100% black are applied in the print processing. If the setting ID is "2", the toner saving is only applied in the print processing.

Figure 8:
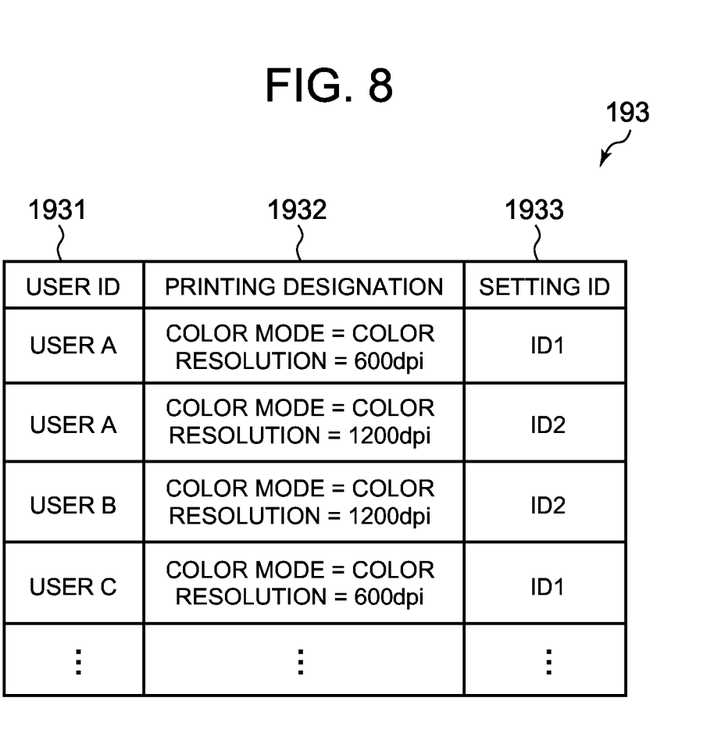
FIG. 8 is a schematic view showing designation data.

As shown in FIG. 8, the designation data 193 includes a user ID column 1931, a printing designation column 1932 and a setting ID column 1933.

The user ID column 1931 stores a user ID. The user ID is a first condition.

The printing designation column 1932 stores print setting information that indicates one or plural setting items. The print setting information is a second condition.

The setting ID column 1933 stores the setting ID.

A source of the printing job is a user, such as user A, B or C, that is identified by the user ID stored in the user ID column 1931 of a certain record of the designation data 193. And the print setting information designated by the printing job corresponds to the print setting information stored in the printing designation column 1932 of the record. In this case, the setting ID stored in the setting ID column 1933 of the record is designated by the control unit 153. For example, when the user A operates the input unit 112 for designating "600 dpi" and "color", the control unit 153 designates the augmented print setting information of "ID 1".

When the user B operates the input unit 112 for designating "1200 dpi" and "color", the control unit 153 designates the augmented print setting information of "ID 2".

When the user C operates the input unit 112 for designating "600 dpi" and "color", the control unit 153 designates the augmented print setting information of "ID 1". The value stored the printing designation column 1932 is registered based on the user operation to the operation display unit 157.

As shown in FIG. 6, the control unit 153 controls a process in the printer 150. For example, when a printing job that is a first printing job is outputted to the control unit 153 from the transmission unit 151, the control unit 153 outputs the first printing job to the print processing unit 154. The control 153 controls the print processing unit 154 to execute the printing process.

On the other hand, when a printing job that is a second printing job is outputted to the control unit 153 from transmission unit 151, the control unit 153 designates the augmented print setting based on the general print setting indicated by the second printing job, by referring the augmented setting data 192 and the designation data 193 stored in the memory unit 152. The control unit 153 adds the data indicating the augmented print setting to the second printing job. The control unit 153 outputs the second printing job to the print processing unit 154. The control unit 153 controls the processing unit 154 to execute the printing process.

The control unit 153 determines whether or not the printing job outputted from the transmission unit 151 includes the augmented print setting information. When the control unit 153 determines that the printing job includes the augmented print setting information, the control unit 153 determines that the printing job is a first printing job. On the other hand, when the control unit 153 determines that the printing job does not include the augmented print setting information, the control unit 153 determines that the printing job is a second printing job.

The print processing unit 154 executes the print processing according to an instruction from the control unit 153.

The print processing unit 154 may include an image processing unit 155 and a printing unit 156.

The image processing unit 155 generates printing data (image forming data) based on the image data included in the printing job by using the general print setting information and the augmented print setting information. The printing data indicates pixel values of each color. The image processing unit 155 outputs the generated printing data to the printing unit 156.

The printing unit 156 forms the image on a sheet based on the printing data.

The operation display unit 157 may include a display unit and an operation unit. The display unit displays state information and print setting information of the printer 150. The operation unit accepts an input.

The memory unit 152 may include a nonvolatile memory such as a flash memory.

The control unit 153 and the image processing unit 155 may each be achieved by single processor such as a CPU (Central Processing Unit) that reads a program that is stored in the nonvolatile memory. Alternatively, the control unit 153 may be achieved by a first processor, while the image processing unit 155 may be achieved by a second processor.

The transmission unit 151 may include a communication apparatus such as NIC (Network Interface Card).

2. Processing

Figure 9:
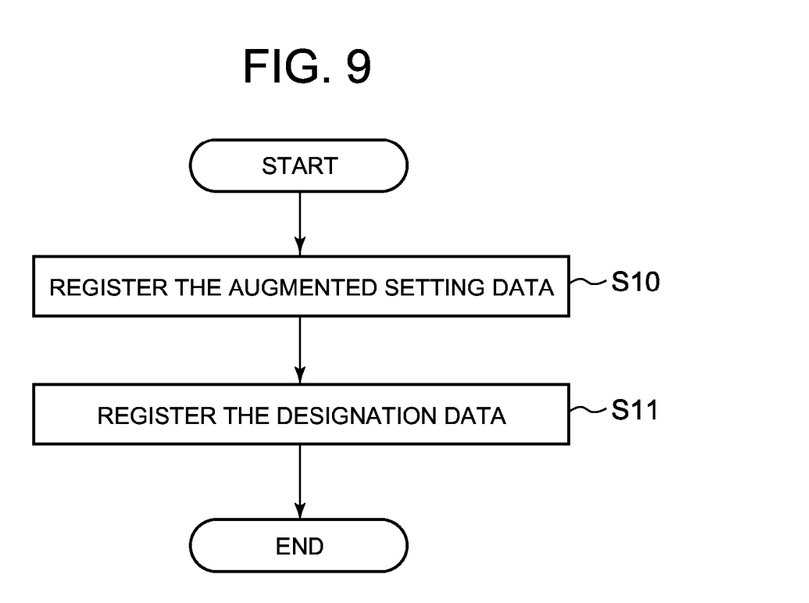
FIG. 9 is a flowchart showing processing when the augmented print setting data and designation data are registered.

FIG. 9 is a flowchart showing processing when the augmented setting data 192 and designation data 193 are registered.

An administrator performs a user operation for registering a value of the augmented setting data 192, to the operation display unit 157. The control unit 153 receives instruction signal based on the user operation. The control unit 153 writes the augmented setting data 192 in the memory unit 152 based on the instruction signal. Namely, the control unit 153 registers the augmented setting data 192 (step S10).

The first PC 110, the second PC 120, the cloud server 130 or the mobile terminal 140 may send the augmented setting data 192 to the printer 150. Then the control unit 153 may register the augmented setting data 192.

The administrator performs the user operation for registering the user ID, the print setting information and the setting ID in the designation data 193, to the operation display unit 157. The control unit 153 receives an instruction signal based on the user operation. The control unit 153 writes the user ID, the print setting information and the setting ID in the memory unit 152 based on the instruction signal. Namely, the control unit 153 registers the designation data 193 (step S11).

The first PC 110, the second PC 120, the cloud server 130 or the mobile terminal 140 each can send the user ID, the print setting information and the setting ID to the printer 150. Then the control unit 153 may register the user ID, the print setting information and the setting ID in the designation data 193.

The control 153 is able to update the augmented setting data 192 and the designation data 193 based on the user operation to the operation display unit 157, the first PC 110, the second PC 120, the cloud server 130 or the mobile terminal 140 by the administrator.

Figure 10:
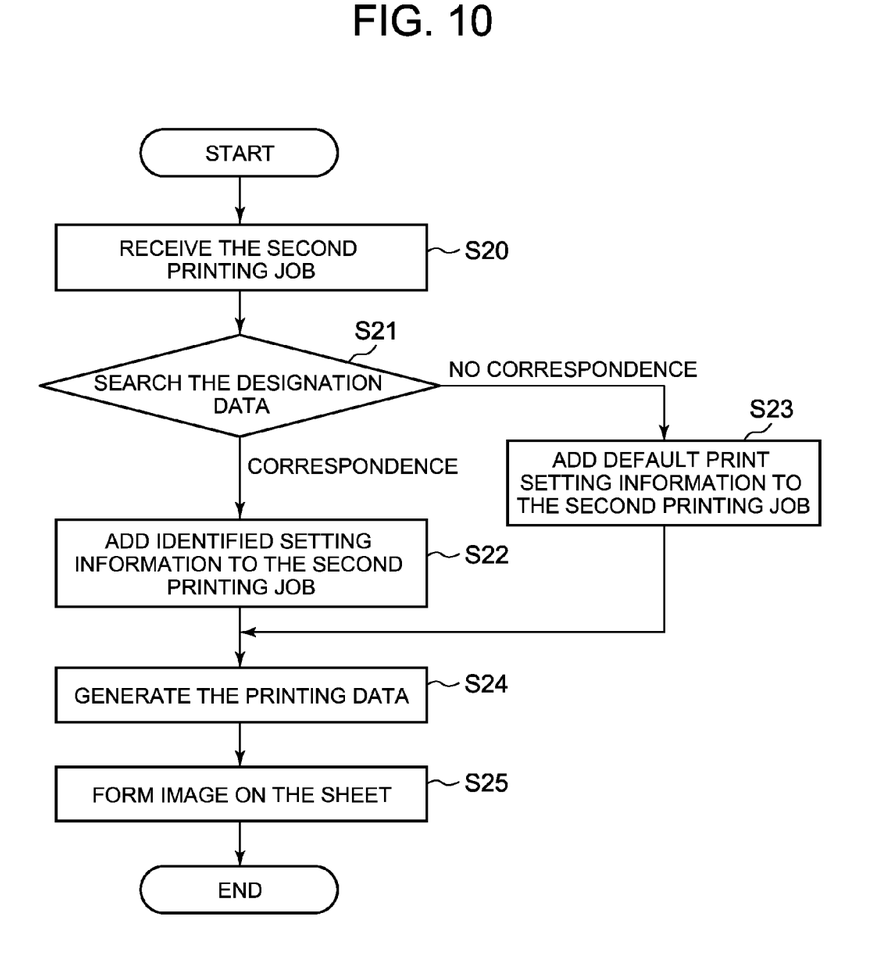
FIG. 10 is a flowchart showing the processing when the printer receives a second printing job from a PC.

FIG. 10 is a flowchart showing processing when the print processing is executed based on a second printing job that is generated by the printer driver 1251. Particularly, FIG. 10 shows the processing when the printer 150 receives the second printing job from the PC 120 including the printer driver 1251. For example, in case the user A performs the user operation for instruction of printing through the second setting screen 191, to the input unit 122, the second printing job includes the user ID of the user A and the general print setting information. Particularly, the second printing job includes data indicating "user A" as the user ID, "600 dpi" as the resolution, "A4" as the paper size, "none" as the duplex printing and "color" as the color/monochrome.

The transmission unit 151 of the printer 150 receives the second printing job (step S20). The transmission unit 151 outputs the received second printing job to the control unit 153.

The control unit 153 extracts the user ID and the general print setting information from the second printing job. The control unit 153 detects that the augmented print setting information is not included in the second printing job. The control unit 153 compares the extracted user ID and the extracted general print setting information with the designation data 193 stored the memory unit 152. Then the control unit 153 determines whether or not the extracted user ID and the extracted general print setting information satisfy the first condition and the second condition included in the stored designation data 193. Namely, the control unit 153 searches the stored designation data 193 (step S21). Then, if the extracted user ID and the extracted general print setting information corresponds to the user ID and the print setting information in the stored designation data 193, the control unit 153 determines that the first condition and the second condition are satisfied (step S21: correspondence). When the first condition and the second condition are satisfied (step S21: correspondence), the control unit 153 moves the process to step S22. However, when the first condition or the second condition is not satisfied (step S21: no correspondence), the control unit 153 moves the process to step S23.

First setting information is one or more items of the general print setting information. For example, the first setting information is the user ID included in the second printing job. Second setting information is one or more items of the general print setting information. For example, the second setting information is "toner saving" and "toner saving for 100% black" included in the second printing job.

In step S22, the control unit 153 extracts the setting ID from the record, which satisfies the first condition and the second condition, of the designation data 193. The control unit 153 identifies the augmented print setting information corresponding to the extracted setting ID by referring to the augmented setting data 192. The control unit 153 designates (adds) the identified augmented print setting information to the second printing job. For example, when the second printing job includes "user A" as the user ID, "color" as the color/monochrome and "600 dpi" as the resolution, the control unit 153 extracts "ID 1" as the setting ID. Then the control unit 153 designates "ON" as "the toner saving" and "ON" as "the toner saving for 100% black" to the second printing job. Namely, the control unit 153 designates the augmented print setting information that is not designated in the second printing job. The control unit 153 outputs the second printing job to the image processing unit 155. The second printing job includes the augmented print setting information. The control unit 153 moves the process to step S24.

In step S23, the control unit 153 designates default print setting information as the augmented print setting information of the second printing job. For example, the control unit 153 designates "OFF" as "the toner saving" information and "OFF" as "the toner saving for 100% black" information, of the second printing job. The control unit 153 moves the process to step S24.

The image processing unit 155 generates the printing data based on the second printing data outputted by the control unit 153 (step S24). In the generated printing data, the general print setting information (the resolution and the color/monochrome) of the second printing job and the augmented print setting information (the toner saving and the toner saving for 100% black) added in step S22 or step S23 are reflected. The image processing unit 155 outputs the generated printing data to the printing unit 156.

The printing unit 156 forms an image on a sheet by using the generated printing data (step S25).

By the way, when the printer 150 receives a first printing job from the first PC 110, the control unit 153 detects that the augmented print setting information is included in the first printing job. In printer 150, the print processing is executed based on a first printing job.

According to the embodiment of the disclosed invention, even if the user cannot designate the augmented setting information, the image forming apparatus can form an image on the sheet based on the augmented setting information. For example, even if the user performs the user operation for instruction of printing through the printer driver 1251, or the user performs the user operation for an instruction of direct printing, the printer 150 can designate the augmented print setting information. Then the printer 150 can form the image on the sheet based on the augmented setting information. Particularly, the control unit 153 of the printer 150 can designate "toner saving" and "toner saving for 100% black" as the third setting information based on "user ID" as the first setting information and "color/monochrome" and "resolution" as the second setting information.

In the embodiment, the first printing job and the second printing job include the user ID. However, the first printing job and second printing may not include the user ID. In this case, the user ID is sent to the printer 150 separately with the printing job.

The memory unit 152 of the printer 150 may store user ID identification information for relating the user ID with other identification information (for example, IP address and MAC address). The control unit 153 of the printer 150 may identify the user ID based on the user ID identification information when the control unit 153 receives the printing job from the first PC 110, the second PC 120, the cloud server 130 or the mobile terminal 140.

In the embodiment, the user ID is stored in the memory unit 111 and the memory unit 121 in advance. However, the first setting screen 190 and the second setting screen 191 may be used to accept input of the user ID.

The first PC 110 and the second PC 120 may accept an input of the user ID when the first PC 110 and the second PC 120 are started. Then the memory unit 111 and the memory unit 121 may store the user ID. The printer driver 1151 and the printer driver 1251 may store the user ID.

In the embodiment, the printer 150 designates the print setting information based on the "user ID" and the print setting information that have already been set. However, the printer 150 designates the print setting information based on the print setting information that has already been set without "user ID". Specifically, the print setting information that has already been set is the first print setting information and the second print setting information. For example, the first print setting information may be "color/monochrome". The second print setting information may be "resolution".

In the embodiment, the augmented print setting information is designated based on the designated resolution and the designated color/monochrome. However, the augmented print setting information may be designated based on another item or items of the general print setting information, for example, the designated paper size or the designated duplex printing.

In the embodiment, the augmented print setting information is "the toner saving" and "the toner saving for 100% black". However, the augmented print setting information may be any of a number of other types of information. One is "correcting extra-fine line". A value of "the correction extra-line" is "ON" and "OFF". The augmented print setting information may also be or include "executing drum cleaning before printing". A value of "the executing drum cleaning before printing" is "ON" and "OFF". The augmented print setting information could also include "100% black is always formed with K". A value of "100% black is always formed with K" is "ON" and "OFF". The augmented print setting information could also include "maintaining a page layout in printing with zooming In and Out". A value of "the maintaining a page layout in printing with zooming In and Out" is "ON" and "OFF".

According to the invention, the printer 150 may be replaced with a copy apparatus, a multi function printer (MFP) and a FAX apparatus.

The present invention is not limited to the foregoing embodiment but many modifications and variations are possible within the spirit and scope of the appended claims of the invention.

What is claimed is:

1. An image forming apparatus comprising:
   a communication apparatus configured to receive an image forming job including
      a first parameter for first print setting and a value of the first parameter,
      a second parameter for second print setting and a value of the second parameter, and
      image data;
   a control unit including a processor and a non-transitory medium containing instructions executable by the processor to thereby
      determine whether the image forming job includes predetermined addition information, and
      determine a value of a third parameter based on the value of the first parameter and the value of the second parameter in response to a determination that the image forming job does not include the predetermined addition information; and
   a printing device configured to form an image on a sheet based on the image data using the value of the third parameter, wherein
   the first, second and third parameters are different from one another,
   the values of the first and second parameters are designable by a first printer driver and a second printer driver,
   the value of the third parameter is designable by the first printer driver, but not by the second printer driver, and
   upon receiving the image forming job from the second printer driver, the processor determines the value of the third parameter based on the value of the first parameter and the value of the second parameter.

2. The image forming apparatus according to claim 1, wherein the printing device forms the image on the sheet based on the image data using the values of the first, second and third parameters.

3. The image forming apparatus according to claim 2, wherein the printing device generates image forming data indicating pixel values based on the image data using the values of the first, second and third parameters, and forms the image on the sheet based on the image forming data.

4. The image forming apparatus according to claim 1, wherein the predetermined addition information is the third parameter and a designated value of the third parameter.

5. The image forming apparatus according to claim 1, wherein
   each of the first and second parameters is for setting one of a color/monochrome, a resolution and a paper size, and
   the third parameters is for setting toner saving.

6. An image forming apparatus, comprising:
   a communication apparatus configured to receive an image forming job including
      image data,
      first data indicating source identification of the image data, and
      second data including a first parameter for first print setting and a value of the first parameter;
   a control unit including a processor and a non-transitory medium containing instructions executable by the processor to thereby
      determine whether the image forming job includes predetermined addition information, and
      determine a value of a second parameter based on the first data and the second data in response to a determination that the image forming job does not include the predetermined addition information; and
   a printing device configured to form an image on a sheet based on the image data using the value of the second parameter, wherein
   the first and second parameters are different from each other, the value of the first parameter is designable by a first printer driver and a second printer driver, the value of the second parameter is designable by the first printer driver, but not by the second printer driver, and upon receiving the image forming job from the second printer driver, the processor determines the value of the second parameter based on the first data and the second data.

7. The image forming apparatus according to claim 6, wherein the printing device forms the image using both the value of the first parameter and the value of the second parameter.

8. The image forming apparatus according to claim 7, wherein the printing device generates image forming data indicating pixel values based on the image data using the values of the first and second parameters, and forms the image on the sheet based on the image forming data.

9. The image forming apparatus according to claim 6, wherein the source identification is user identification.

10. The image forming apparatus according to claim 6, wherein the predetermined addition information is the second parameter and a designated value of the second parameter.

11. The image forming apparatus according to claim 6, wherein
the first parameter is for setting one of a color/monochrome, a resolution and a paper size, and
the second parameter is for setting toner saving.

12. An image forming apparatus comprising:
a communication apparatus configured to receive an image forming job including
a first parameter for first print setting and a value of the first parameter,
a second parameter for second print setting and a value of the second parameter, and
image data,
a memory configured to store a third parameter for third print setting and a plurality of values of the third parameter beforehand;
a control unit including a processor and a non-transitory medium containing instructions executable by the processor to thereby
determine whether the image forming job includes predetermined addition information, and
extract at least one of the values of the third parameter stored in the memory based on the value of the first parameter and the value of the second parameter included in the image forming job in response to a determination that the image forming job does not include the predetermined addition information; and
a printing device configured to form an image on a sheet based on the image data using the extracted value of the third parameter, wherein
the first, second and third parameters are different from one another,
the values of the first and second parameters are designable by a first printer driver and a second printer driver,
the value of the third parameter is designable by the first printer driver, but not by the second printer driver, and
upon receiving the image forming job from the second printer driver, the processor extracts the at least one value of the third parameter stored in the memory based on the value of the first parameter and the value of the second parameter included in the image forming job.

13. The image forming apparatus according to claim 12, wherein the control unit extracts the at least one value of the third parameter stored in the memory corresponding to the value of the first parameter and the value of the second parameter included in the image forming job.

14. The image forming apparatus according to claim 12, wherein the predetermined addition information is the third parameter and a designated value of the third parameter.

15. The image forming apparatus according to claim 12, wherein
each of the first and second parameters is for setting one of a color/monochrome, a resolution and a paper size, and
the third parameter is for setting toner saving.

* * * * *